W. E. PERKINS.
MARKING GAGE.
APPLICATION FILED APR. 1, 1909.
948,523.
Patented Feb. 8, 1910.
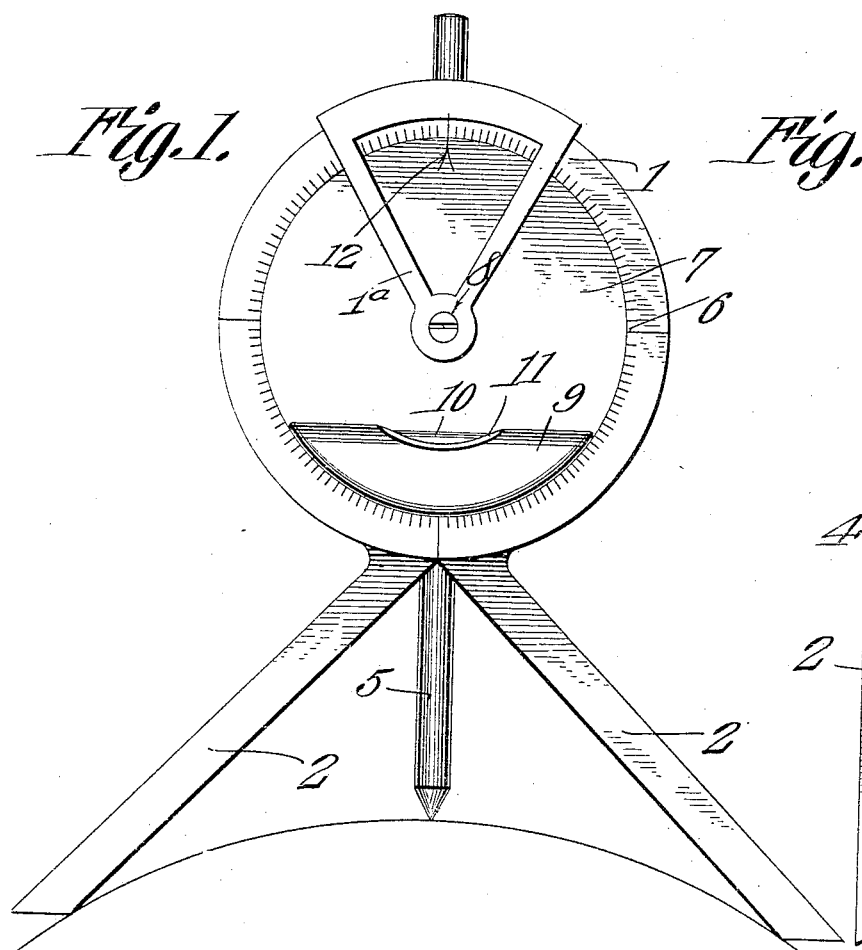
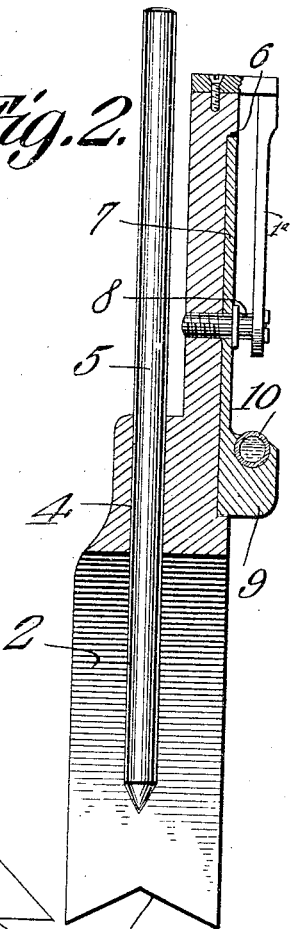
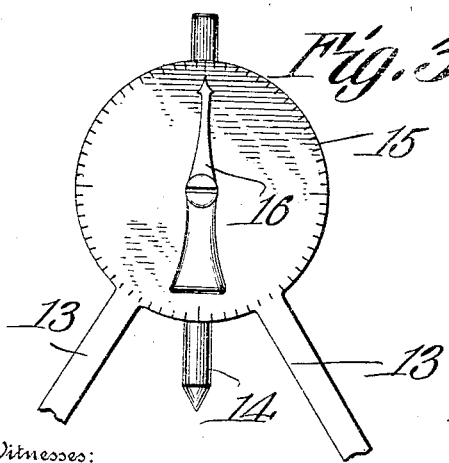
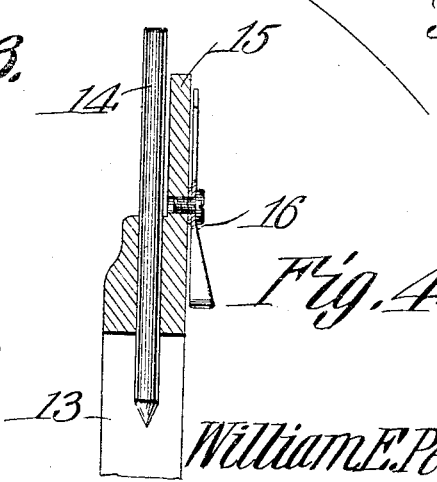
Witnesses:
Inventor
William E. Perkins
By C. A. Snow & Co.
Attorneys.

UNITED STATES PATENT OFFICE.

WILLIAM EDWARD PERKINS, OF FLORENCE, COLORADO, ASSIGNOR OF FORTY-NINE ONE-HUNDREDTHS TO HARRY E. GARLOCK, OF FLORENCE, COLORADO.

MARKING-GAGE.

948,523.  Specification of Letters Patent.  Patented Feb. 8, 1910.

Application filed April 1, 1909. Serial No. 487,200.

*To all whom it may concern:*

Be it known that I, WILLIAM E. PERKINS, a citizen of the United States, residing at Florence, in the county of Fremont and State of Colorado, have invented a new and useful Marking-Gage, of which the following is a specification.

This invention relates to marking gages.

The object of the invention is to provide an implement of this character which may be employed as a surface tester, a level and plumb, and a marker for laying off circular bodies, such as shafts, in locating key-seats, and which shall be simple in construction, efficient and durable in use, and accurate in performing the functions designed.

With the above and other objects in view, as will appear as the nature of the invention is better understood, the same consists in the novel construction and combination of parts of a marking gage, as will be hereinafter fully described and claimed.

In the accompanying drawings forming a part of this specification, and in which like characters of reference indicate corresponding parts, Figure 1 is a view in front elevation of one form of marking gage constructed in accordance with the present invention. Fig. 2 is a vertical transverse sectional view through the center of the gage. Fig. 3 is a view in front elevation of a modified form of gage. Fig. 4 is a vertical transverse sectional view through the center of the gage shown in Fig. 3.

The gage in Figs. 1 and 2, comprises, in an integral structure, a graduated countersunk dial 1, and a pair of divergent legs 2, the terminals of which are preferably V-notched, as at 3, to secure accurate contact between the implement and the object in connection with which it is being used. At the crotch of the legs, and back of the dial, is formed a longitudinal bearing 4 that is engaged by a center punch 5 which is of a length to project above the dial, and thus to protect the latter from injury, as from hammer blows.

Arranged within the countersink 6 of the dial, and disposed flush with the marginal face of the latter, is a disk indicator 7, preferably of metal, and which is held assembled with the dial by a pivot screw 8. Carried by and formed preferably integral with the indicator is a hollow counterweight 9 in which is arranged a spirit level tube 10 of the usual or any preferred construction, the bubble of which is exposed to view through a sight opening 11 formed at the center of the counterweight. The longitudinal axis of the level is disposed exactly at right angles to a line drawn through the center of the indicator and cutting the pointer mark 12 and the dial, and this will permit the implement to determine in an accurate manner whether a surface is horizontal, or plumb, and if not how many degrees or parts of degrees it is out.

In use in laying out a key-way on a shaft, when the location is decided, the punch is struck a blow, thus indicating one end of the key-way, and the implement is then placed against the shaft at some distance from the prick mark, and by observing the pointer mark to see that it exactly coincides with the graduation on the dial opposite which it was when the first punch mark was made, the second mark can be pricked in exact alinement with the first.

In the modified form shown in Figs. 3 and 4, the construction of the implement is the same as that above described, as to the arrangement of the legs 13 and punch 14. The only difference is that the dial 15 is flat, and an ordinary counterweighted pointer 16 is employed in lieu of the disk indicator. The operation of the two implements, however, is the same, as the last-named can secure every function of that first described.

In the form of gage shown in Figs. 1 and 2 the pivot 8 is supported at its outer end by a bracket 1ª secured to the rim of the dial and extending downwardly in front thereof.

What is claimed is:

1. A marking gage embodying a graduated dial having an offset on its back, a pair of divergent legs projecting from said dial, a center punch mounted in the offset and passing between the legs, and an indicator pivotally mounted in front of the dial.

2. A marking gage embodying a graduated dial having an integral offset on its back, a pair of divergent legs projecting therefrom, a center punch mounted in the offset and passing between the legs, a pivot secured in the center of the dial, an indicator mounted on said pivot, and a bracket secured on the upper edge of the dial and depending in front thereof to support the end of the pivot in front of the indicator.

In testimony that I claim the foregoing as my own, I have hereto affixed my signature in the presence of two witnesses.

WILLIAM EDWARD PERKINS.

Witnesses:
   H. E. Garlock,
   A. N. Parnall.